United States Patent
Sinsel et al.

(10) Patent No.: US 7,452,434 B2
(45) Date of Patent: *Nov. 18, 2008

(54) METHODS AND APPARATUS FOR SURFACE PREPARATION AND DUAL POLYMERIC LAYER COATING OF CONTINUOUS-STRIP FLAT-ROLLED SHEET METAL, AND COATED PRODUCT

(75) Inventors: John A. Sinsel, Weirton, WV (US);
Mark V. Loen, Steubenville, OH (US);
Michael S. Bailey, Landenberg, PA (US)

(73) Assignee: ISG Technologies, Inc., Bethlehem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/156,471

(22) Filed: May 28, 2002

(65) Prior Publication Data
US 2002/0168532 A1    Nov. 14, 2002

(51) Int. Cl.
*B32B 15/08* (2006.01)
*B29C 47/02* (2006.01)

(52) U.S. Cl. .................. 156/244.19; 156/244.11; 156/244.18; 264/171.14; 264/171.17; 264/171.21; 428/461; 428/463

(58) Field of Classification Search ............. 427/211, 427/407.1; 156/244.11, 244.19, 244.18; 205/153, 154, 155, 156
See application file for complete search history.

(56) References Cited

U.S. PATENT DOCUMENTS

| | | | | |
|---|---|---|---|---|
| 4,048,355 A | * | 9/1977 | Sakayori et al. | 427/375 |
| 4,389,438 A | * | 6/1983 | Ohtsuki et al. | 428/34.2 |
| 4,941,935 A | * | 7/1990 | Gregory | 156/243 |
| 5,238,517 A | * | 8/1993 | Heyes | 156/243 |
| 5,736,086 A | * | 4/1998 | Jones et al. | 264/171.17 |
| 5,919,517 A | * | 7/1999 | Levendusky et al. | 427/211 |
| 5,942,285 A | * | 8/1999 | Schmid et al. | 427/318 |
| 5,976,652 A | * | 11/1999 | Krause et al. | 428/35.9 |
| 6,143,825 A | | 11/2000 | Beren et al. | |
| 6,773,217 B2 | * | 8/2004 | Sinsel et al. | 413/1 |
| 2003/0152788 A1 | * | 8/2003 | Velliky | 428/461 |

* cited by examiner

*Primary Examiner*—Monique R Jackson
(74) *Attorney, Agent, or Firm*—Berenato, White & Stavish

(57) ABSTRACT

Processes and apparatus for manufacturing an engineered-composite combining rigid flat-rolled sheet metal continuous-strip and selected polypropylene thermoplastics, which are formulated into dual polymeric coating layers for extrusion deposition, as distinct layers, on a single surface at a time, of continuous-strip, traveling in-line at ambient temperature. Steps for forming a uniform thickness of polymeric layers across strip width, and attraction to an activated metallic surface which provides enhanced adhesion. Solidification of the polymeric layers is augmented by strip temperature during continuous-in-line travel; final dual-surface finishing provides for complete bonding of the polymeric layers on both metallic surfaces.

38 Claims, 3 Drawing Sheets

METHODS AND APPARATUS FOR SURFACE PREPARATION AND DUAL POLYMERIC LAYER COATING OF CONTINUOUS-STRIP FLAT-ROLLED SHEET METAL, AND COATED PRODUCT

RELATED APPLICATIONS

This application is a continuation-in-part of U.S. application Ser. No. 09/490,305 filed Jan. 24, 2000, entitled "Polymeric Coated Metal Strip and Method for Processing Same."

INTRODUCTION

This invention relates to methods and apparatus for combining extrusion polymeric coating with rigid flat-rolled sheet metal; and, more specifically, is concerned with process and apparatus for surface preparation and dual-polymeric layer coating of rigid sheet metal, a single-surface at a time, so as to enhance adhesion during continuous-in-line travel of rigid sheet metal continuous-strip.

OBJECTS OF THE INVENTION

An important object is combining selected thermoplastic polymers for dual-layer extrusion deposition on a single surface, at a time, so as to establish polymeric adhesion enabling in-line production processing of composite product with enhanced end-usage capabilities.

A related object is providing polymeric coating technology for rigid flat-rolled sheet metal for achieving dual polymeric coating during in-line travel with continuous-strip at ambient temperature.

A further object is providing for continuous-in-line processing for increased product uniformity, coating integrity, and productivity.

DETAILED DESCRIPTION OF THE DRAWINGS

Figure 1:
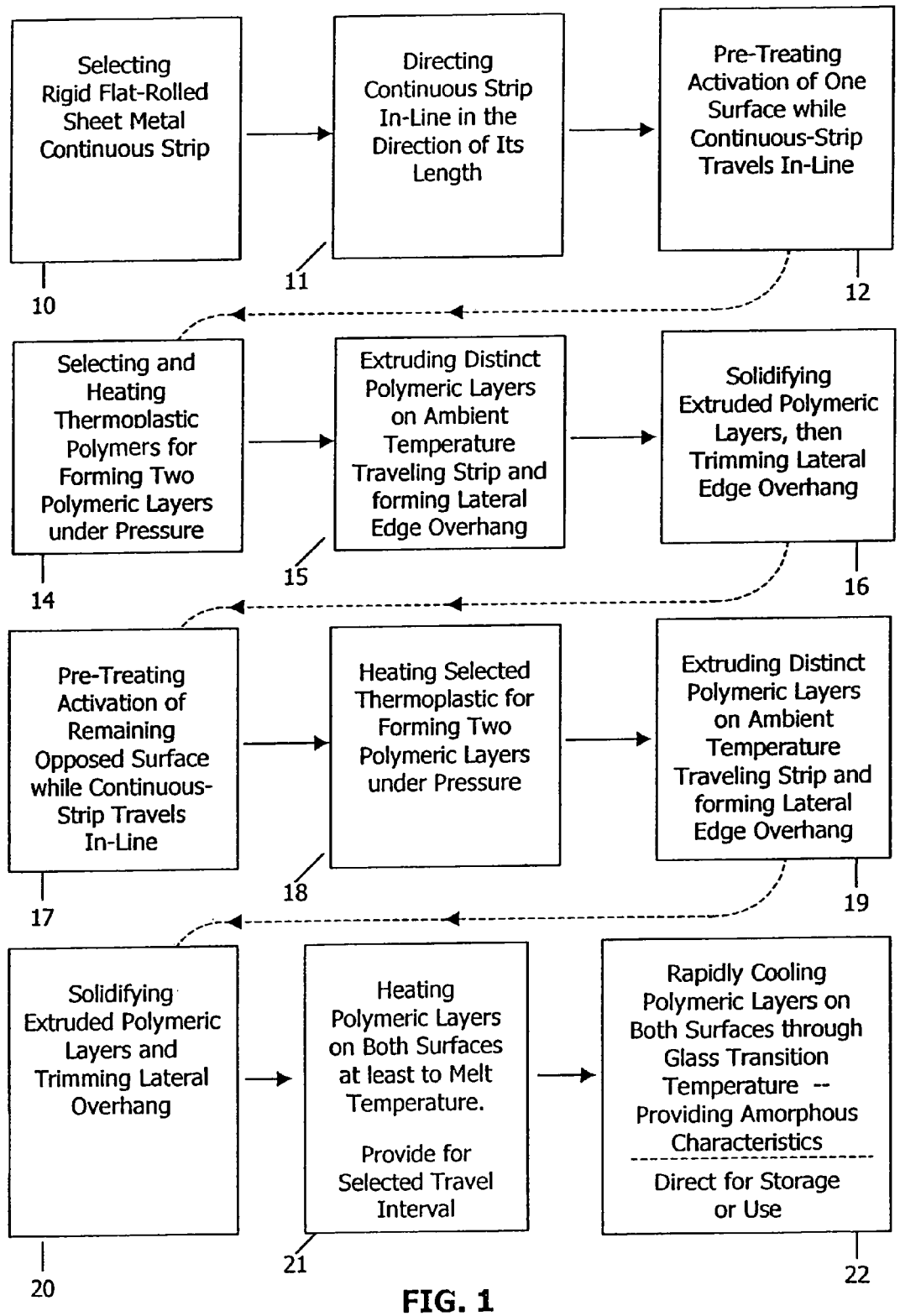
FIG. 1 is a box-diagram flow-chart presentation for describing production processing steps of the invention.
Figure 2:
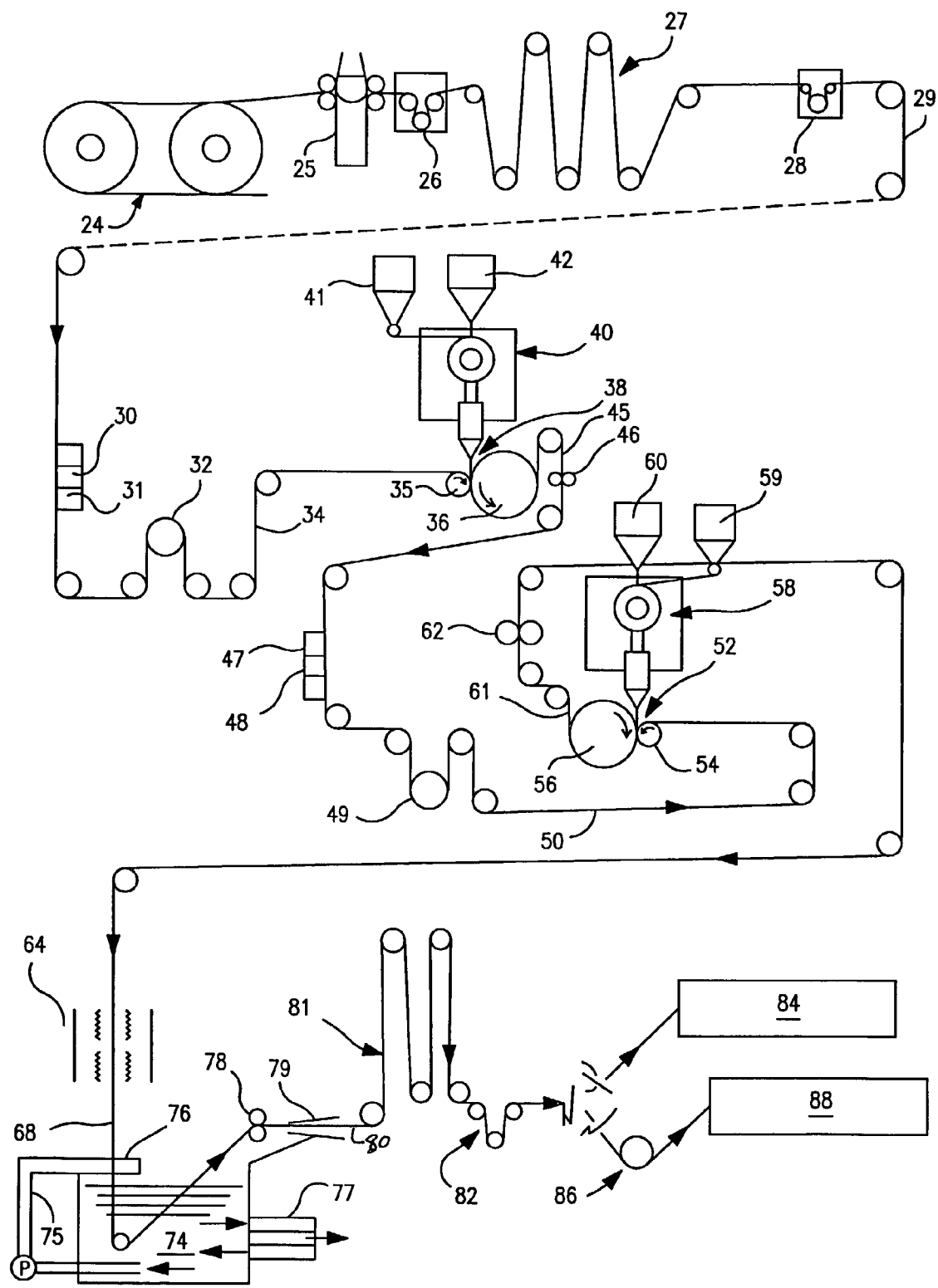
FIG. 2 is a schematic continuous-in-line view, partially in cross-section, for describing apparatus of the invention; and, in conjunction with FIG. 1, for describing sequential in-line handling.

FIGS. 1 and 2 relate, respectively, to processing steps for carrying out the invention for the production of polymeric coated continuous strip and to continuous-in-line apparatus for carrying out the invention.

Flat-rolled sheet metal is selected, at Station 10 at FIG. 1, by first eliminating "foil" thickness gages. Rigid flat-rolled sheet metals are selected which contribute impact resistance, tensile strength, and other mechanical properties, which remain substantially constant over the normal range of climatic temperatures encountered during use. Rigid sheet metal also enables directing continuous-strip in-line, as indicated at Station 11, for single-surface, at a time, pre-treatment at Station 12. Dual polymeric coating provides for a smooth exterior finish-surface, with abrasion-resistance, and flexibility. Each finish-surface layer is also selected for adhesion to the first-contacting layer for the metallic surface. The finish-surface polymeric coating thus contributes to manufacture and end-usage of the composite material.

Rigid flat-rolled continuous-strip steel and rigid flat-rolled continuous-strip aluminum facilitate continuous-in-line handling and processing; and, each contributes to increasing end-usage products. Mild steel, also referred to as low-carbon steel (about 0.02% to about 0.035% C), provides for a wide selection of tensile strengths, along with favorable aging properties.

Flat-rolled low-carbon steel thickness gages are selected above two mils (0.002"). Non-ferrous metallic coating of the steel is selected for corrosion protection; which combined with the dual-polymeric coating layers as taught, increases end product utilization in the container, construction, and other industries. Selections of protective metallic surfaces for steel, and other specifics, are covered in more detail later herein.

Rigid flat-rolled aluminum is selected with thickness gages above about 0.0045"; and, contributes in particular to several types of end-usage container products. Rigid flat-rolled aluminum/magnesium alloy in combination with dual-polymeric-coating, as taught herein, contributes end-usage products in other industries such as building construction, boating and vehicle manufacture.

Selecting rigid flat-rolled sheet metal at Station 10 of FIG. 1, enables directing in-line at Station 11, with the ability to control movement of rigid continuous-strip traveling in the direction of its length, so as to enable carrying out a plurality of distinct in-line operations, in sequence, on one opposed surface at a time, as the strip presents substantially-planar opposed surfaces extending between its lateral edges. Such distinct processing operations, for each surface, are considered in describing both FIGS. 1 and 2.

In-line pre-treatment of a first surface is carried out at Station 12. Single-surface pre-treatment and single-surface processing continue throughout a major portion of the in-line processing, prior to final processing steps concerned with finishing the polymeric coating layers on both surfaces simultaneously.

The single surface pre-treating of Station 12, involves open flame treatment which burns-off any surface lubricant or particulate contaminant; and, further initiates surface activation for accepting extruded polymeric deposition. Corona-discharge pre-treatment of that single metallic surface also contributes to surface activation for enhanced polymeric adhesion. Selection of open flame treatment, corona-discharge treatment, and/or their combination, contribute to enhanced adhesion of a specified polymeric bonding layer of the invention.

Selected thermoplastic polymers are formulated into a pair of polymeric layers at Station 14, for deposition on such single pre-treated surface. Maleic anhydride polypropylene is selected as a first-contacting "bonding" polymeric layer. Polymerization of ethylene and polypropylene (CoPP) is selected as a preferred finish-surface polymeric layer, for surface coating flexibility. Homopolymer polypropylene may also be selected for combination with CoPP, or as the finish-surface layer.

Availability of the polypropylenes, with dependable standards and properties, available on a commodity basis, contributes to the productivity and capacity of the present processing.

Polypropylenes, with a melt temperature of about 340° F. are extruded, as distinct polymeric layers, at Station 15. Such selected polymeric layers enable deposition on ambient temperature strip; eliminating any requirement for pre-heating the metallic surface to extrusion temperature. Deposition of melted polymeric layers on ambient temperature strip facilitates in-line solidification of the melted extruded polymeric layers.

As indicated at Station 16 of FIG. 1, and described in more detail in relation to FIG. 2, polymeric layers, formulated as described in the above embodiment, are deposited across strip width, and, further, to provide polymeric overhang at each lateral edge when coating such single activated surface. These steps are carried out while the strip is moving in-line at ambient temperature of about seventy degrees to about ninety degrees Fahrenheit. Heat of the melted polymeric layers, promptly moves toward the ambient temperature strip; initiating solidification upon strip contact; and, enabling in-line solidification by contact with a temperature-modulated surface. Such in-line surface contact is maintained at a temperature in the range of about 150° F. to about 170° F.; which provides desired solidification enabling for continued in-line travel of the solidified polymeric coated strip within that temperature range.

As indicated in FIG. 1, the strip then travels in-line for pre-treating the remaining opposed surface, to activate that surface at Station 17 of FIG. 1. Surface-activation is carried-out by selection, as described in relation to the first surface, from the group consisting of open flame treatment, corona-discharge treatment, and a combination thereof. The number of in-line surface pre-treating units is selected based on line speed. The resulting surface-activation facilitates a type of bonding, which is apparently chemical, between the first-contact organic polymeric layer and the activated inorganic metallic surface.

The thermoplastic polymers, formulated as described above, are heated, melted, and pressurized as dual-polymeric layers at Station 18 of FIG. 1; and extruded under pressure at Station 19, for deposition on ambient temperature strip traveling in the direction of its length. Such deposition on the remaining surface is also carried out to produce a polymeric overhang at each lateral edge of the moving strip, as indicated at Station 19 of FIG. 1. Trimming solidified lateral overhang, at each lateral edge, contributes to the capability for obtaining a uniform polymeric coating thickness on each surface. It has been found that a tendency exists for edge build-up when extruding thin-film layers along an elongated width. Extrusion of the polymers produces an edge thickening which is solidified. Eliminated that, as taught herein, by depositing a polymeric overhang and trimming that solidified edge-thickened overhang achieves a substantially uniform coating thickness across strip width.

After in-line solidification of the polymeric layers, and trimming of the polymeric overhang at each lateral edge, at Station 20 of FIG. 1, the strip is directed for travel toward a finishing stage at Station 22 of FIG. 1. The solidified polymeric layers on both opposed surfaces are melted at Station 21. Induction heating of the strip can be used with the selected polymeric layers, without detriment to the substrate properties; for example, tin plating on steel; or annealed softening of aluminum. Such induction heating helps to rapidly raise the temperature of the strip and the polymeric layers during the rate of strip travel provided by the processing and selected polymers. Melting of the dual polymeric coating layers is carried-out at selected line speeds, which can extend above about fifteen hundred feet per minute.

At Station 21 of FIG. 1, the polymeric layers are raised to a temperature in a range of about 340° F. to about 440° F.; and the coated strip travels for a selected interval of about six-tenths of a second to about one second. That enables filling of any voids or crevices with polymer due to topography of each opposed metallic surface. Bonding strength is augmented between the named first-contact polymeric layer and the activated metallic surface; and, the finish-surface layer bonds to the first-contacting layer; such finish processing substantially eliminates pinholes in the dual-polymeric coating layer covering each surface.

After such selected interval of in-line travel, the polymeric layers on each surface, are rapidly cooled through glass transition temperature, at Station 22 of FIG. 1. Rapid cooling produces desired amorphous characteristics throughout the polymeric layers which contribute to flexibility of the polymeric coatings during fabrication of end-usage products.

Preferably, as taught herein, surfaces of the sheet metal substrate are pre-cleansed and, flat-rolled steel surfaces are preferably protected with a non-ferrous metallic coating, prior to entry into the polymeric coating production apparatus line of FIG. 2.

Referring to FIG. 2, coils and equipment are arranged at the entry section so as to enable continuous-strip in-line operations. Continuous strip from coils at ramp 24 is directed for shearing and welding station 25. Bridle rolls 26, looper 27, and bridle rolls 28 facilitate supply of continuous-strip for continuous in-line travel; and, help to maintain desired in-line speed.

Rigid flat-rolled sheet metal continuous-strip 29 travels in-line for preparation of a single surface, at a time, for polymeric coating. Open-flame burners, such as 30, 31 burn-off any surface lubricant and particulate debris from that flat-rolled sheet metal surface. Oxygen level and the fuel are controlled so as to produce an oxidizing reaction by impingement of the open-flame with that surface, which activates that surface so as to accept of the first-contacting polymeric coating layer with enhancement adhesion.

An electrical potential near to, but free of forming an electrical arc with that surface, at corona discharge unit 32, also activates that surface so as to enhance polymeric adhesion. The number of such pre-treatment units is selected based on in-line travel-rate of the work product.

Single surface preparation is selected from the group consisting of solely open-flame treatment, solely corona-discharge treatment, and a combination of those two pre-treatments, so as to achieve desired surface-activation for adhesion of the polymeric coating first-contacting layer.

Continuous strip 34, with such single pre-treated surface, travels at ambient temperature for polymeric extrusion coating. Pressure roll 35, in combination with a temperature modulating roll 36, form coating nip 38. Extrusion apparatus 40 directs melted polymers, under pressure, into coating nip 38, between rolls 35 and 36, rotating as shown.

Thermoplastic polymers are pre-selected, and formulated to specifications and supplied from sources 41, 42, respectively, as a maleic anhydride modified polypropylene first-contacting layer; and a finish-surface layer selected from the group consisting of polymerized ethylene polypropylene copolymer (CoPP), and a polypropylene homopolymer. Each of those formulated dual formulated polymeric coating layers is fed as a distinct polymeric layer; and each is fed under pressure from extrusion apparatus 40.

Strip 34, with a single pre-treated surface, travels in-line at approximately ambient temperature, in a range of about seventy to ninety degrees Fahrenheit, into nip 38. Pressure roll 41, presents a non-metallic surface, such as Teflon-coated neoprene. Temperature-modulating roll 36 preferably presents a chrome plated metallic surface. Pressure roll 35 helps to compact the polymers onto strip 34, which is moving at ambient temperature.

The polymeric coating materials are extrude at or above melt temperature; such as about 340° F. to about 440° F. Strip 34, traveling at ambient temperature, helps to initiate solidification of the polymeric coating layers, as heat from the layers moves toward the cooler strip. The polymeric coating is also in contact with the external surface of rotating temperature-modulating roll 36, which is temperature controlled internally to avoid being heated, by surface-contact of the polymers, above a desired temperature; for example, a temperature of about 150° F. to 170° F. The polymeric coated strip, in the selected temperature range, separates from roll 36 for in-line travel. The radius of roll 36 is selected to provide for separation, after surface contact through about half the circumference of roll 36.

Single-surface polymeric coated strip 45 of FIG. 2, separates from roll 36, in the direction indicated, with solidified polymeric coating for in-line travel, polymeric metallic overhang is removed at edge trimmer 46.

Strip 45 travels toward surface activating equipment for the remaining surface. The number of open-flame units and corona discharge units for the remaining surface, correspond to those selected earlier; and, are based on line speed. Open flame burners 46, 47 and/or corona discharge unit 49 remove surface contaminants and activate the remaining surface for enhanced bonding with the first-contacting polymeric layer.

Strip 50 of FIG. 2 with the remaining surface activated for receiving a polymeric coating, travels at substantially ambient temperature, into coating nip 52, between contact pressure roll 54 and temperature-modulating roll 56. Polymeric coating is extrusion deposited under pressure onto that remaining activated surface.

Pre-selected thermoplastic polymers, are formulated to specifications, as described above, and are fed into extruder 58 from supply sources 59, 60. Distinct dual polymeric coating layers, as previously described are extrusion deposited, one as a first-contacting bonding layer and, one as a finish-surface layer.

Strip 50 travels at substantially ambient temperature (about 70° F. to about 90° F.) into nip 52 for extrusion deposition of distinct polymeric layers, as previously described, onto that remaining surface.

Heat promptly moves from the melted polymers toward the ambient temperature strip, which initiates solidification, which continues during surface contact with temperature-modulating roll 56 which is temperature-controlled. Reaching a temperature of about one hundred fifty to about one hundred seventy degrees Fahrenheit, strip 61, with solidified polymers on both surfaces, separates from roll 56. Solidified polymeric overhang is removed at edge trimmer 62.

Dual-polymeric layer coated strip 61 travels toward finishing at heater 64. The dual polymeric coatings on both surfaces are melted. Heater 64 can combine induction heating of the strip for melting the polymeric coating layer on both surfaces.

An induction heating unit can act rapidly to melt the polymeric coating at line speeds of over 1500 feet per minute, as provided. The strip travels for a brief interval, to help complete the bonding of the first-contact layer with each metallic surface; and, bonding of the finish-surface layer with the first-contacting layer. Crevices or valleys due to the topography of each metallic surface are filled, providing complete coverage of each such surface. The finish-surface external polymeric layer is bonded with the first-contacting layer to provide an external smooth finish on each polymeric-layer coated surface.

Then, the polymeric coating on both surfaces is rapidly cooled through glass transition temperature in quench bath 74. Laminar flow of coolant along both surfaces of strip is provided by flow-unit 75, which pumps cooler liquid from tank 74 and directs it for laminar flow at 76, along both surfaces. Temperature control of the quench bath coolant can be augmented by heat exchange unit 77.

Rapid-cooling of the polymeric coating through glass-transition temperature, produces non-directional amorphous characteristics throughout the polymeric layers. Coolant is removed at wringer rolls 78, and each surface is dried at dryer 79. Strip 80 travels through looper 81 and bridle rolls 82 toward recoil section 84; or, a polymeric surface can be treated by corona-discharge treatment at unit 86, which prepares that surface for lithographic printing or other pre-fabrication steps at section 88.

Figure 3:
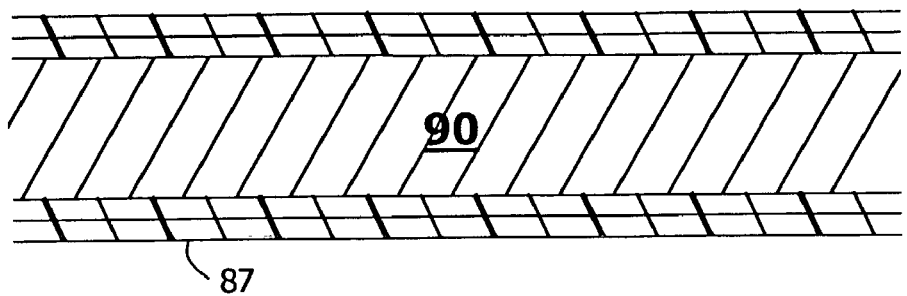
FIGS. 3 through 6 are enlarged cross-sectional views for describing specific polymeric-coated rigid flat-rolled sheet metal embodiments of the invention and end-usage applications thereof.

In FIG. 3, rigid aluminum sheet metal 90 is coated on both surfaces with the above-described dual-polymeric layers, the dual layer on one surface is indicated at 91. Continuous-strip pre-coated with dual-polymeric layers as described, provides for deep-drawing and side-wall ironing from pre-coated stock; and, eliminates the pin-hole problem of internal solvent spray coating of a polymer, after can body formation. The interior pin-hole free integrity of the present dual layer coating avoids dissolution of the aluminum substrate, which is detrimental to shelf life and an important taste factor.

Figure 4:
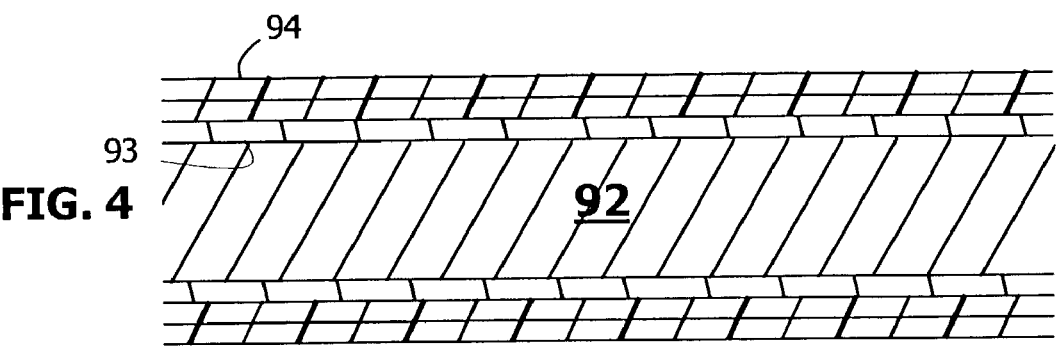

In FIG. 4, rigid mild steel 92, includes a non-ferrous metallic protective coating, such as 93, on each respective surface. Such metallic coating, is selected as described above from: electrolytic tinplate or electrolytically plated chrome/chrome oxide (TFS); a cathodic dichromate treatment achieved by immersion in cathodic dichromate, or electrolytic action, dependent on intended coating thickness; which is referred to as full-finish blackplate.

The above composites enable products of pre-coated can stock for multiple canning markets; however, electrolytically plated zinc is generally preferred for easy-open integral openers.

Each respective protective metallic surface is dual-polymeric coated as shown at 94 of FIG. 4, and as described above. And, uses for can manufacture can include a colorant, such as $T_iO_2$; or a blooming compound organic lubricant in one or both surface layers.

Also, the composites of FIG. 4, serve construction uses, such as insulated 2×4s which avoid "sweat" problems now experienced when non-insulated 2×4s are used between interior and exterior walls. Also, clear-coated dual-polymeric layer flow-brightened tin plate, provides light reflectors for fluorescent light fixtures; and, also for manufacture of light reflective or mirror-like panels.

Figure 5:
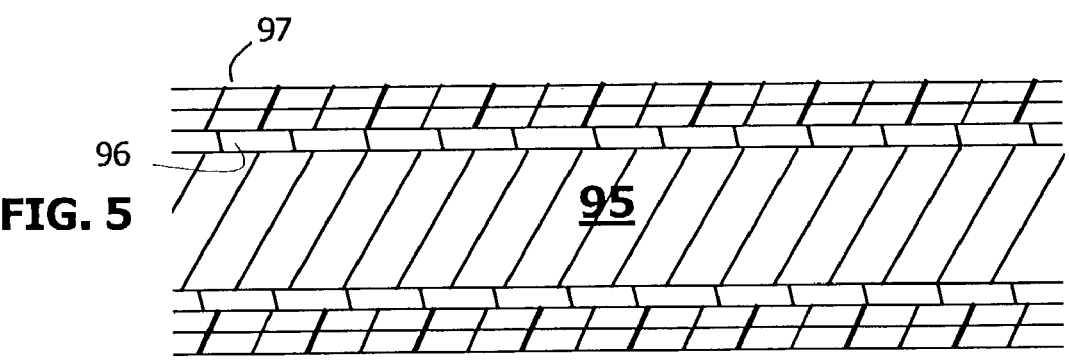

In FIG. 5, mild steel substrate 95, is hot-dip zinc-spelter coated on each surface; such non-ferrous metallic product surface for a single surface as designated reference number 96. Such hot-dip zinc-spelter coated mild steel surfaces are dual polymeric layer coated; as indicated for by a single surface reference number 97. A preferred use for the composite of FIG. 5 is duct systems. The glass-like finish surface diminishes friction on the interior for any duct fluid; decreasing energy requirements and costs, for either liquid or pneumatic flow. In an air duct system, for example for commercial office or apartment buildings, the finish-surface for the interior duct surface, could readily include zeolite-encased silver; which acts as a antimicrobial agent for decreasing air borne bacteria; and, would preferably be located at a heat-exchange station for ease of replacement.

Other uses for the polymeric coated strip of FIG. 5 include: dual-polymeric layer insulated surfaces for doors for residencies, apartments, etc.; also insulated door and window framing for both internal and external usage; and, other thermal and sound insulated construction elements, such as panels and 2×4's.

Figure 6:
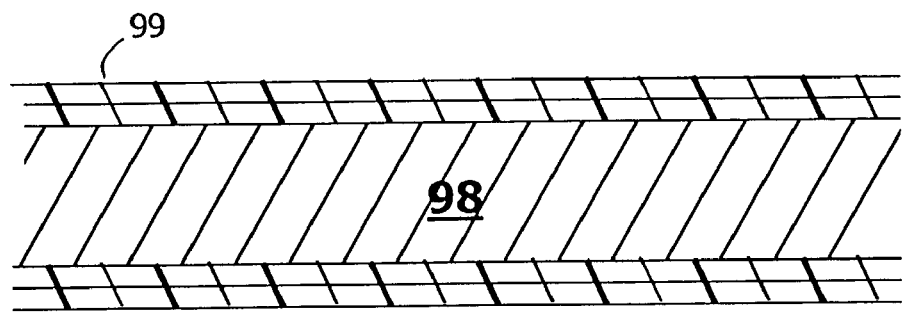

In FIG. 6, an aluminum/magnesium alloy substrate 98 provides a rigid high-strength substrate, with dual-polymeric coating layer, such as designated at 99 for a single surface. Such dual polymeric coating layers, extrusion-deposited, as described in relation to FIGS. 1 and 2, provide an engineered composite for panel use in appliances and for duct work; also, for small-boat, automotive and tractor panel manufacture; each with substrate strength and impact-resistant polymeric coatings. Such finish surface polymeric coating can be include a colorant or can be readily painted.

Mild steel, or low-carbon steel, as referred to herein, contains about 0.02 to bout 0.03% carbon, and is available with various selected single-reduced or double-reduced tensile strengths and temper ratings for dual-layer polymeric coating.

The thickness of continuous-strip flat-rolled mild steel for electrolytic plating purposes is generally designated by base-weight from about fifty to one hundred and one-hundred thirty five pounds per base box (about 50 pounds per base box to about 135 pounds per base box; in which a base box is defined as an area of 3136 square inches; that provides a mild sheet thickness gage of about 0.005" to about 0.015". Available mild steel properties can vary from tensile strength for single reduced (SR), temper 4, 5 mild steel of about forty to fifty thousand pounds per square inch; to double-reduced (DR) temper 8, 9 mild steel having a tensile strength of about eighty to ninety thousand pounds per square inch.

Chrome/chrome oxide (TFX) non-ferrous metallic coating for low-carbon steel, would be in the range of about 0.3 to 2.0 mils per surface; which includes about three to thirteen mg. per square foot chrome, and about 0.7 to about 2.4 mg. per square foot chrome oxide.

Electrolytically tin plating of mild steel, including uniform coating weight on each surface, or differentially-coated on each surface; would have coating weight selected in the range of 0.05 to about 1.25 pounds per base box.

A hot-dip zinc-spelter coating for rigid flat-rolled mild steel would be selected in a weight range of about 0.4 to about 0.9 ounce per square foot, total both surfaces; that is: about 0.2 to about 0.45 ounce per square foot of coated surface. Zinc spelter finishes can be selected with differing types of spangle, with an iron/zinc alloyed surface, or as a brushed-bright reflective surface. Aluminum content of hot-dip zinc-spelter is selected, and can vary from about 0.1% to about 50% for GALVALUM™; also, certain special hot-dip spelters, such as GALFAN®, further include misch-metal additives.

The polypropylene polymeric layers, described above, are coated in a range of about one mil to about two mils per surface for many uses; however, with a coating thickness of about four mils for exterior construction purposes. Such polypropylene polymeric layers can be ordered to specifications from suppliers, such as:

Basell Polyoleins USA, Inc.
2801 Centreville Road
Wilmington, Del. 19808.

Open-flame burners, to size specifications for the line, can be ordered from:

Flynn Burner Corporation
425 Fifth Ave.
(P.O. Box 431)
New Rochelle, N.Y. 10802

Corona discharge electrodes are ordered to specification can be ordered from:

Enercon Industries Corp.
W140 N9572 Fountain Boulevard
Menomonee Falls, Wis. 53052

The polymeric extrusion apparatus, for dual polymeric coating layers, as described above, can be ordered to specifications considering line-speed from:

Black Clawson Converting Machinery, LLC.
46 North First Street
Fulton, N.Y. 13069.

While specific values, materials, dimensional relationships, and other specifics have been presented for purposes of describing the invention; however, it should be recognized that with the benefit of the above disclosures, changes in those values would be available to those skilled in-the-art, while still relying on the concepts and principles as disclosed above. Therefore, for purposes of evaluating patent coverage for the disclosed subject matter, reference should be made to the scope of the appended claims, which should be read in conjunction with the above disclosures, for purposes of interpretation in evaluating the scope of valid patent coverage of the presently-disclosed subject matter.

What is claimed is:

1. A process for extrusion coating a metal strip, comprising the steps of:

activating a first metallic surface of a metallic protective coating of a metal strip;

presenting the metal strip at substantially ambient temperature and co-extruding a maleic anhydride propylene thermoplastic polymer first contact layer and a thermoplastic polymer first finish-surface layer onto the activated first metallic surface of substantially ambient temperature and beyond opposite lateral edges of the metal strip to establish overhang portions, the first contact layer being in direct surface-to-surface contact with the activated first metallic surface, the first finish-surface layer overlying the first contact layer;

trimming the overhang portions of the first contact layer and the first finish-surface layer extending beyond lateral edges of the metal strip; and permitting the first contact and first finish-surface layers to solidify.

2. The process of claim 1, wherein said permitting step includes allowing the ambient temperature strip to serve as a heat sink so that the first contact layer and the first finish-surface layer solidify on the metal strip.

3. The process of claim 2, wherein the metal strip has a thickness in a range of 5 mils to 15 mils.

4. A process for extrusion coating a metal strip, comprising the steps of:

activating a first metallic surface of a metal strip having opposite lateral edges;

co-extruding a maleic anhydride polypropylene thermoplastic polymer first contact layer and a thermoplastic polymer first finish-surface layer onto the activated first metallic surface and beyond the opposite lateral edges to establish overhang portions while presenting the metal strip at substantially ambient temperature for said co-extrusion, the first contact layer being co-extruded in direct surface-to-surface contact with the activated first metallic surface, and the first finish-surface layer overlying the first contact layer;

trimming the overhang portions of the first contact layer and the first finish-surface layer extending beyond the lateral edges;

permitting the first contact and first finish-surface layers to solidify;

heating the metal strip and thereby melting the first contact and first finish-surface layers; and rapidly cooling the first contact and first finish-surface layers through glass transition temperatures of the thermoplastic polymers.

5. The process of claim 4, wherein the metal strip is selected from low-carbon steel, aluminum, and aluminum/magnesium alloy.

6. The process of claim 4, further comprising continuously traveling the metal strip in a lengthwise direction during said co-extruding, melting, and rapidly cooling stages.

7. The process of claim 4, wherein said activating step includes exposing the first metallic surface to at least one of open flame treatment, corona-discharge treatment and combinations thereof.

8. The process of claim 4, wherein said substantially ambient temperature is in a range of about 70° F. to about 90° F.

9. The process of claim 4, wherein the first finish-surface layer comprises a member selected from the group consisting of ethylene polypropylene copolymer, polypropylene homopolymer, and combinations thereof.

10. The process of claim 4, wherein said melting step causes the first contact layer to fill voids, if any, in the metal strip.

11. The process of claim 4, further comprising the steps of activating a second metallic surface of the metal strip;

co-extruding a maleic anhydride polypropylene thermoplastic polymer second contact layer and a thermoplastic polymer second finish-surface layer onto the activated second surface while presenting the metal strip at substantially ambient temperature for said co-extrusion, the second contact layer being co-extruded in direct surface-to-surface contact with the activated second metallic surface, the second finish-surface layer overlying the second contact layer;

permitting the second contact and second finish-surface layers to solidify;

heating the metal strip and thereby melting the first and second contact layers and the first and second finish-surface layers; and rapidly cooling the first and second contact layers and the first and second finish-surface layers through glass transition temperatures of the thermoplastic polymers.

12. The process of claim 11, wherein the metal strip further comprises first and second non-ferrous metallic protective coatings defining the first and second metallic surfaces, respectively.

13. The process of claim 12, wherein the protective coatings are selected from electrolytic plated tin, electrolytic plated chrome/chrome oxide, cathodic dichromate treatment, electrolytic plated zinc, and hot-dip spelter.

14. The process of claim 11, wherein the first and second finish-surface layers are formed of the same material.

15. The process of claim 11, wherein the first contact and first finish-surface layers are extruded prior to extrusion of the second contact and second finish-surface layers.

16. The process of claim 11, wherein the overhang portions of the first contact layer and first finish-surface layer comprise first overhang portions, and wherein the process further includes the step of extruding the second contact layer and the second finish-surface layer beyond the opposite lateral edges of the strip to establish second overhang portions.

17. The process of claim 16, further including the step of trimming the second overhang portions of the second contact layer and the second finish-surface layer extending beyond the lateral edges.

18. The process of claim 11, including the step of extruding the first and second contact layers and the first and second finish-surface layers at a temperature in excess of the melt temperature of the materials comprising the first and second contact layers and the first and second finish-surface layers.

19. The process of claim 11, wherein said permitting step includes allowing the ambient temperature strip to serve as a heat sink so that the first and second contact layers and the first and second finish-surface layers solidify.

20. The process of claim 11, wherein the heating step is achieved by induction heating of the strip.

21. The process of claim 4, including the step of moving the strip at a speed of about 1500 feet per minute while the activation, co-extrusion, permitting, heating and cooling steps are being performed.

22. The process of claim 4, wherein said permitting step includes allowing the ambient temperature strip to serve as a heat sink so that the first contact layer and the first finish-surface layer solidify on the metal strip.

23. The process of claim 22, wherein the metal strip has a thickness in a range of 5 mils to 15 mils.

24. The process of claim 4, wherein the metal strip further comprises a first non-ferrous metallic protective coating defining the first metallic surface of the metal strip.

25. A process for extrusion coating a metal workpiece, comprising:

providing a metal sheet having substantially planar, opposite-facing first and second metallic surfaces extending width-wise between longitudinally extending lateral edges;

co-extruding a maleic anhydride polypropylene thermoplastic polymer first contact layer and a distinct thermoplastic polymer first finish-surface layer on the first metallic surface while the metal sheet is presented at a substantially ambient temperature so as to place the first contact layer into direct surface-to-surface contact with the activated first metallic surface, extending the thermoplastic polymer first contact and first finish-surface layers across the width of the metal sheet to establish a first overhang projecting beyond the lateral edges, and permitting the thermoplastic polymers to solidify into a first polymeric coating;

co-extruding a maleic anhydride polypropylene thermoplastic polymer second contact layer and a distinct thermoplastic polymer second finish-surface layer on the second metallic surface while the metal sheet is presented at a substantially ambient temperature so as to place the second contact layer into direct surface-to-surface contact with the activated second metallic surface, extending the thermoplastic polymer second contact and finish-surface layers across the width of the metal sheet to establish a second overhang projecting beyond the lateral edges, and permitting the thermoplastic polymers to solidify into a second polymeric coating;

trimming the solidified overhangs;

melting the first and second polymeric coatings solidified on the metal sheet; and rapidly cooling the first and second polymeric coatings and the metal sheet through glass transition temperatures of the thermoplastic polymers to establish amorphous characteristics throughout the first and second polymeric coatings.

26. The process of claim 25, wherein the metal sheet is selected from low-carbon steel, aluminum, and aluminum/magnesium alloy.

27. The process of claim 25, further comprising continuously traveling the metal sheet in a lengthwise direction during said co-extruding, melting, and rapidly cooling stages.

28. The process of claim 25, further comprising pre-treating the first and second metallic surfaces with heat, and permitting the metallic surfaces to cool to substantially ambient temperature prior to said co-extruding steps.

29. The process of claim 25, wherein ambient temperature is in a range of about 70° F. to about 90° F.

30. The process of claim 25, wherein the first and second finish-surface layers comprise a member selected from ethylene polypropylene copolymer, polypropylene homopolymer, and a combination thereof.

31. The process of claim 25, wherein said melting causes the first and second contact layers to fill voids, if any, in the metal sheet.

32. The process of claim 25, wherein said melting improves bonding between the first contact layer and the first finish-surface layer, and improves bonding between the second contact layer and the second finish-surface layer.

33. The process of claim 25, wherein the metal sheet further comprises first and second non-ferrous metallic protective coatings defining the first and second metallic surfaces, respectively.

34. The process of claim 33, wherein the protective coatings are selected from electrolytic plated tin, electrolytic plated chrome/chrome oxide, cathodic dichromate treatment, electrolytic plated zinc, and hot-dip spelter.

35. The process of claim 25, wherein the metal sheet has a thickness in a range of about 5 mils to about 15 mils.

36. The process of claim 25, wherein each of the first and second contact layers and first and second finish-surface layers is about 1 mil to about 2 mils.

37. The process of claim 25, further comprising permitting the metal sheet at ambient temperature to serve as a heat sink so that the first and second coatings solidify on the metal sheet.

38. The process of claim 37, wherein the metal sheet has a thickness in a range of 5 mils to 15 mils.

* * * * *